United States Patent Office 3,428,606
Patented Feb. 18, 1969

---

3,428,606
COPOLYMERS OF FORMALDEHYDE AND A MIXTURE OF DICARBONALS
Henri Sidi, Paramus, N.J., assignor to Tenneco Chemicals, Inc., a corporation of Delaware
No Drawing. Continuation-in-part of application Ser. No. 389,196, Aug. 12, 1964, now Patent No. 3,372,146, dated Mar. 5, 1968. This application Feb. 1, 1966, Ser. No. 523,954
U.S. Cl. 260—67    13 Claims
Int. Cl. C08g 1/04, 1/12

ABSTRACT OF THE DISCLOSURE

Di(alkoxymethyl)dicarbonals and di(hydroxymethyl)-dicarbonals are polymerized with formaldehyde or its cyclic trimer trioxane to form polyacetal resins that contain randomly-occurring oxymethylene groups and randomly-occurring groups derived from these dicarbonals. These new polymers are particularly suitable for molding applications and may be fabricated into films, filaments, fibers, rods and tubes.

---

This is a continuation-in-part of U.S. Patent 3,372,146, granted Mar. 5, 1968.

This invention relates to formaldehyde polymers. More particularly it relates to a new class of high molecular weight copolymers of formaldehyde and certain dicarbonals, as well as to the process by which they are prepared. These new polymers are particularly suitable for molding applications and may be fabricated into films, filaments, fibers, rods and tubes. The polymers of this invention are characterized by excellent thermal and hydrolytic stability and are in many ways more stable than any of the commercially-available homopolymers and copolymers of formaldehyde.

The new class of polymers has been prepared by interpolymerizing monomeric formaldehyde or its cyclic trimer, trioxane, with a mixture of isomeric dicarbonals having structures represented by the formulas (I)
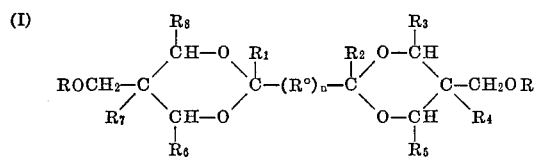

and (II)
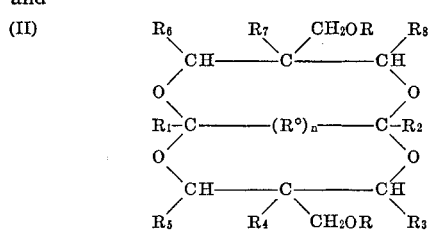

in each of which structures $R°$ represents a divalent radical which may be either alkylene, substituted-alkylene, arylene, or aralkylene; $R$, $R_1$, $R_2$, $R_3$, $R_5$, $R_6$, and $R_8$ represent hydrogen or alkyl groups containing from 1 to 5 carbon atoms; $R_4$ and $R_7$ represent alkyl groups containing from 1 to 5 carbon atoms; and $n$ represents an integer in the range of zero to 3.

Structurally, these new polymers contain recurring oxymethylene groups (—OCH$_2$—) interspersed with recurring groups derived from the polyfunctional dicarbonal and having randomly variant structures depending upon which carbonal carbon atom was initially attacked during the interpolymerization reaction. By way of illustration, one of these recurring groups probably possesses the polyfunctional structure

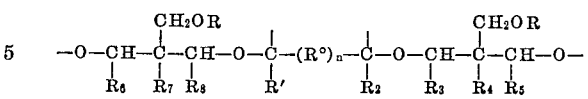

to which structure may be linked branched chains of recurring oxymethylene groups, other oxyalkylene groups, or other groups derived from the dicarbonal. Because of the polyfunctionality of the isomeric dicarbonals, it is impossible to unequivocally characterize these new polymers structurally. The branched chains of the polymer molecules may be terminated by hydroxyl groups, or by other end groups. Alternatively, two or more of these branched chains may be joined to form cross-linked molecules.

The isomeric dicarbonals which are employed to prepare the new class of polymers are themselves prepared by reacting a dicarbonyl compound (which is either a dialdehyde, a diketone or a ketoaldehyde) having the structure

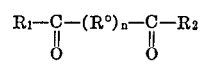

with a 1,1,1-trimethylolalkane, thereby forming a cyclic hydroxyacetal, hydroxyketal, or hydroxyketalacetal, depending upon the structure of the dicarbonyl compound. The cyclic hydroxy compound may then be reacted with an alkylating agent, such as diazomethane or a lower alkyl sulfate, to convert it to the corresponding alkoxy compound. As used herein, therefore, the term "dicarbonal" generically denotes the isomeric diacetals, diketals, and ketal acetals formed by reacting the corresponding dicarbonyl compound with a 1,1,1-trimethylolalkane as well as the alkoxy compounds obtained by reacting these hydroxy compounds with an alkylating agent. In all probability, both isomers I and II are formed during the reaction of the dicarbonyl compound and the 1,1,1-trimethylolalkane; isomer I probably is the predominant reaction product.

Among the isomeric dicarbonals which may be used to prepare the polymers of this invention are those prepared from glyoxal, pyruvaldehyde, glutaraldehyde, malonaldeyhe, and benzil with such 1,1,1-trimethylolalkanes as trimethylolethane, trimethylolpropane, trimethylolbutane, trimethylolpentane, trimethylolhexane, and mixtures thereof as well as the lower alkyl ethers of these dicarbonals. More particularly these dicarbonals include such compounds as glyoxal-bis-(trimethylolethane acetal), glyoxal-bis-(trimethylolpropane acetal), glyoxal-bis-(trimethylolbutane acetal), glyoxal-bis-(trimethylolhexane acetal), pyruvaldehyde-bis-(trimethylolpropane acetal), pyruvaldehyde-bis-(trimethylolbutane acetal), malonaldehyde-bis-(trimethylolethane acetal), glutaraldehyde-bis-(trimethylolethane acetal), benzil-bis-(trimethylolethane acetal), and the methyl, ethyl, propyl, isopropyl, and butyl mono- and diethers of these compounds. A single dicarbonal or a mixture of two or more of these compounds may be used in the preparation of the polymers of this invention.

As has been indicated, compounds in which each R represents hydrogen or a lower alkyl group may be used in the preparation of the polymers of this invention. When high molecular weight polymers are the desired products, compounds in which at least one R represents an alkyl group (monoalkyl ethers) and preferably both R's represent alkyl groups (dialkyl ethers) are generally used. If desired, mixtures containing a major amount of a dialkyl ether and a minor amount of a dihydroxy compound or a monoalkyl ether may be used in the preparation of the high molecular weight polymers.

A wide range of molar proportions of the dicarbonal may be incorporated in the polymer, depending upon the particular properties which are desired in the resultant product. For example, particularly satisfactory molding properties may be obtained in those polymers having a molecular weight in the range between about 5,000 and about 100,000 and containing from about 0.01 to about 7 percent by weight, based on the weight of the polymer, of the polyfunctional group derived from the dicarbonal. Since the use of the dicarbonal in the polymer necessarily results in some cross-linking, the stability and processing characteristics of these polymers are dependent upon the amount of dicarbonal incorporated into the polymer structure. For example, the inclusion of as little or 0.01 percent by weight (based on the weight of the polymer) of the polyfunctional unit derived from the dicarbonal is sufficient to improve the corresponding homopolymer or copolymer containing oxyalkylene and oxymethylene units. In most instances, the presence of more than about 7 percent by weight of the polyfunctional unit derived from the dicarbonal in the polymer structure results in a product which is so cross-linked that it no longer possesses the rheological properties of a thermoplastic resin. To retain thermoplasticity, the copolymer should possess a molecular weight in the range from about 10,000 to about 100,000 and contain from about 0.05 to about 4 percent by weight (based on the weight of the polymer) of the recurring polyfunctional unit derived from the dicarbonal.

Either monomeric formaldehyde or trioxane may be used in the preparation of polymers of this invention. To obtain polymer products having the desired properties, however, the formaldehyde component should be substantially anhydrous; that is, it should contain less than 0.5 percent and preferably less than 0.1 percent by weight of water.

The interpolymeriaztion of the formaldehyde component and the dicarbonal may be conducted at a temperature in the range from about 0° C. to about 100° C. and preferably from 20° C. to 70° C. in the presence or in the absence of a formaldehyde polymerization initiator, which functions to catalyze the polymerization reaction. When used, the formaldehyde polymerization initiator is generally employed in an amount in the range from about 0.001 to about 5 percent and, preferably, from 0.01 to 0.5 percent by weight, based on the weight of monomeric formaldehyde or trioxane which undergoes reaction.

Any of the well-known formaldehyde polymerization initiators can be used in the process of the invention, including aliphatic amines, hydroxypolyamines, phosphines, arsines, stilbenes, organometallic compounds, and boron trifluoride compounds, particularly when monomeric formaldehyde is the formaldehyde source. When trioxane is used as the source of recurring oxymethylene groups, best results have been obtained using as the initiator either boron trifluoride or a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride diethyl etherate and boron trifluoride di-n-butyl etherate.

The interpolymerization of the formaldehyde component and the dicarbonal is usually carried out in a reaction medium which remains liquid under the polymerization conditions employed. Suitable reaction media include hydrocarbons containing 3 to 10 carbon atoms per molecule, such as propane, hexane, decane, cyclohexane, toluene, xylene, and decahyronaphthalene; esters, such as methylene diacetate and methylene dipropionate (the use of both of which is described in my U.S. Patent No. 3,219,630); hydrocarbon halides; and ethers. As a general rule, the amount of the reaction medium used is within the range of 1 part to 1000 parts and in most cases 1 part to 100 parts by weight per part by weight of the monomers.

The interpolymerization reaction may be carried out in any convenient manner. For example, anhydrous monomeric formaldehyde or trioxane may be introduced into a reactor containing the reaction medium, the dicarbonal, and the formaldehyde polymerization initiator. Alternatively, the formaldehyde polymerization initiator may be added to a mixture of the comonomers in the reaction medium or the formaldehyde component, dicarbonal, and formaldehyde polymerization initiator may be added simultaneously to the reaction medium. In either case, the polymerization reaction may be carried out as a batchwise process or as a continuous process.

In adidtion to recurring oxymethylene groups and the recurring groups derived from the dicarbonal, the novel polymers may also contain other recurring structural goups, particularly oxyalkylene groups having at least two carbon atoms, in which even the resultant polymer is a terpolymer. Oxyethylene and substituted oxyethylene groups are especially desirable and may be incorporated into the polymer structure by including in the reaction mixture the desired amount of a cyclic ether having the structure

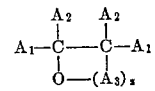

in which $A_1$ and $A_2$ represent hydrogen, alkyl groups having from 1 to 3 carbon atoms, or halogen substituted alkyl groups having from 1 to 3 carbon atoms; $A_3$ represents methylene, oxymethylene, lower alkyl or haloalkyl substituted methylene, oxymethylene, lower alkyl or haloalkyl substituted oxymethylene groups; and $z$ represents an integer in the range of 0 to 3. Illustrative of these cyclic ethers are ethylene oxide and 1.3 dioxolane. When incorporated in the polymer, the oxyalkylene groups may comprise from about 0.1 to about 15 percent and preferably from 0.2 to 3 percent by weight of the weight of the terpolymer. Moreover, when oxyalkylene groups are incorporated in hte polymer structure, the combined weight of the oxyalkylene groups and the groups derived from the dicarbonal should not exceed 20 percent of the weight of the terpolymer.

Since the rates at which the dicarbonal and the cyclic ether undergo interpolymeriaztion are somewhat lower than the rates at which formaldehyde or trioxane reacts under the interpolymeriaztion reaction conditions, it is frequently necessary to use excess amounts of these comonomers during the polymerization reaction so that the desired amount may be incorporated into the polymer structure. For example, the incorporation in to the polymer structure of from about 0.01 to about 7 percent by weight (based on the weight of the polymer) of recurring groups from the dicarbonal usually requires the use in the polymerization reaction of from about 0.05 to about 20 percent by weight (based on the weight of the formaldehyde component) of the dicarbonal, while the incorporation of from about 0.05 to about 4 percent by weight of recurring groups derived from the dicarbonal usually reguires from about 0.1 to about 10 percent by weight of the dicarbonal in the polymerization reaction, based on the weight of the formaldehyde component. Similarly, the incorporation of from about 0.1 to about 25 percent by weight, based on the weight of the polymer, of recurring oxyalkylene groups derived from a cyclic ether usually requires the use in the polymerization reaction of from about 0.5 to about 25 percent by weight of the cyclic ether, based on the weight of the formaldehyde component employed in the process.

The formation of the polymers (copolymers and terpolymers) of the present invention is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose are phenothiazine, 2-mercapto-benzimidazole, diphenylamine, phenyl-α-naphthylamine, bis-(β-naphthylamine)-p-phenylenediamine, 4,4′-butylene-bis-(3-methyl-6-t-butylphenol), and 5-ethyl-10,10-diphenylphenazasiline. The amount of antioxidant used is approximately 0.01 percent to 1 percent based on the weight of the monomers.

To prevent degradation of the polymer resulting from prolonged contact with the polymerization initiator, it is generally desirable to remove or neutralize the initiator upon completion of the polymerization step. When boron trifluoride or a boron trifluoride coordinate complex is used as the initiator, the reaction mixture may be treated with an alkaline material, for example, an aliphatic amine, such as tri-n-butylamine, or an alkali metal salt of an alkanoic acid having from 1 to 18 carbon atoms, to neutralize the initiator. Other initiators may be removed by washing the reaction mixture with water or a suitable organic solvent.

Because improved thermal stability of the polymers may be obtained by using an after-treatment that entails blocking or "capping" of the terminal hydroxyl groups of the polymer chains, it is frequently desirable (though not essential) to chemically stabilize the resultant polymer by acylation, etherification, cyanoethylation, or other such procedures. Alternatively, the raw polymer may be subjected to the controlled degradation (or partial depolymerization) of the polymer chain, for example, by heating or by washing with an alkaline solution, until a terminal group is reached that is inert to further chemical or physical degradation. Excellent results have been obtained by heating the raw polymer to a temperature n the range from about 140° C. and about 220° C. with cyanoguanidine and a phenolic antioxidant to improve its thermal stability.

The dicarbonals that are used in the practice of this invention may be prepared by reacting the appropriate 1,1,1-trimethylolalkane with a dialdehyde, a diketone, or a ketoaldehyde in the presence of an acidic catalyst. For example, to a mixture of 804 grams of trimethylolpropane and 4 grams of p-toluenesulfonic at 120° C. was slowly added 636 grams of glyoxal tetrabutyl acetal. The butanol formed was distilled off to maintain the temperature at about 100° C.; when all the butanol had distilled off, the temperature rose to 130° C. The reaction mixture was then dissolved in 1 liter of butanone. This solution was then heated with 500 ml. of benzene at the reflux temperature of the mixture until it was completely dehydrated. There was recovered about 500 grams of glyoxal-bis-(trimethylolpropane acetal) from the solution. A portion of this dicarbonal was converted to its dimethyl ether by reacting it with diazomethane.

A copolymer may be prepared by the following procedure: A mixture of 392 grams of trioxane, 12 grams of glyoxal-bis-(trimethylolpropane acetal), 170 grams of cyclohexane, and 0.12 ml. of boron trifluoride dimethyl etherate is heated at a temperature in the range of 45° C. to 60° C. for 20 minutes. After washing with 1000 ml. of acetone, 1000 ml. of cold water, 1000 ml. of water at 70° C., and finally with two 1000 ml. portions of acetone, product is dried under vacuum at 65° C. to yield about 150 grams of a trioxane/glyoxal-bis-(trimethylolpropane acetal) copolymer.

A high molecular weight terpolymer may be prepared by the following procedure: A mixture of 1700 grams of trioxane, 10 grams of the dimethyl ether of glyoxal-bis-(trimethylolpropane acetal), 41 grams of 1,3-dioxolane, 700 grams of cyclohexane, and 0.52 ml. of boron trifluoride diethyl etherate is heated at a temperature in the range of 60° C. to 65° C. for 30 minutes. After being washed and dried by the procedure previously described, the terpolymer may be stabilized by heating it with 0.5 percent of its weight of cyanoguanidine in dimethylformamide at 140°–150° C. for 1 hour.

Each of the aforementioned dicarbonals may be polymerized with anhydrous monomeric formaldehyde or trioxane and optionally with a cyclic ether by the procedure hereinbefore described to form copolymers and terpolymers that are characterized by excellent thermal and hydrolytic stability and that may be fabricated into films, fibers, rods, tubes and the like.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A normally solid polymer having an average molecular weight in the range from about 5,000 to about 100,000 and containing within its structure (a) recurring oxymethylene groups in major amounts, based on the weight of the polymer and (b) from about 0.01 to about 7 percent by weight, based on the weight of the polymer, of recurring groups derived from a mixture of isomeric dicarbonals having structures represented by the formulas

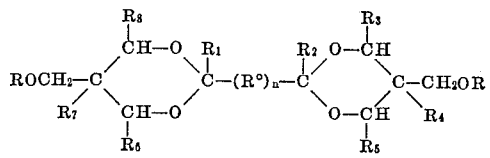

and

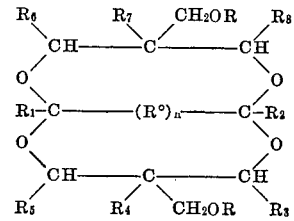

in each of which structures $R^0$ represents a divalent radical selected from the group consisting of alkylene, arylene, and aralkylene; R, $R_1$, $R_2$, $R_3$, $R_5$, $R_6$, and $R_8$ each represents a member selected from the group consisting of hydrogen and alkyl groups containing from 1 to 5 carbon atoms; $R_4$ and $R_7$ each represents an alkyl group containing from 1 to 5 carbon atoms; and $n$ represents an integer in the range of zero to 3.

2. A normally solid polymer as set forth in cliam 1 that contains from 0.05 percent to 4 percent by weight, based on the weight of the polymer, of recurring groups derived from said mixture of isomeric dicarbonals.

3. A normally solid polymer as set forth in claim 2 that contains recurring groups derived from glyoxal-bis-(trimethylolpropane acetal).

4. A normally solid polymer as set forth in claim 2 that contains recurring groups derived from the dimethyl ether of glyoxal-bis-(trimethylolpropane acetal).

5. A normally solid terpolymer having an average molecular weight in the range of from about 5,000 to about 100,000 and containing within its structure (a) recurring oxymethylene groups, (b) from about 0.01 percent to about 7 percent by weight, based on the weight of the terpolymer, of recurring groups derived from a mixture of isomeric dicarbonals having structures represented by the formulas

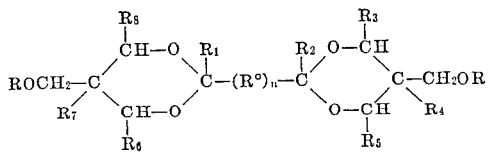

and

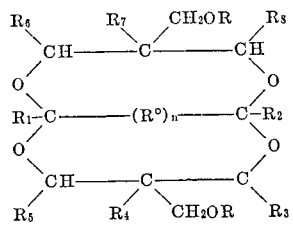

in each of which structures $R^0$ represents a divalent radical selected from the group consisting of alkylene, arylene, and aralkylene; $R$, $R_1$, $R_2$, $R_3$, $R_5$, $R_6$, and $R_8$ each represents a member selected from the group consisting of hydrogen and alkyl groups containing from 1 to 5 carbon atoms; $R_4$ and $R_7$ each represent an alkyl group containing from 1 to 5 carbon atoms; and $n$ represents an integer in the range of zero to 3, and (c) from about 0.1 percent to about 15 percent by weight, based on the weight of the terpolymer, of recurring oxalkylene groups derived from a cyclic ether having a structure represented by the formula

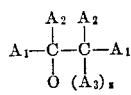

in which $A_1$ and $A_2$ each represent a substituent selected from the group consisting of hydrogen, alkyl groups containing from 1 to 3 carbon atoms, and halo-substituted alkyl groups containing from 1 to 3 carbon atoms; $A_3$ represents a divalent radical selected from the group consisting of methylene, oxymethylene, lower alykl- or haloalkyl-substituted methylene, oxymethylene, lower alkyl- and haloalkyl-substituted oxymethylene groups; and $z$ represents an integer from 0 to 3, the combined weight of recurring groups derived from both the dicarbonal and cyclic ether not exceeding 20 percent by weight of the terpolymer.

6. A normally solid terpolymer as set forth in claim 5 that contains from 0.05 percent to 4 percent by weight, based on the weight of the terpolymer, of recurring groups derived from said mixture of isomeric dicarbonals and from 0.1 percent to 15 percent by weight, based on the weight of the terpolymer, of recurring oxyethylene groups.

7. A normally solid terpolymer as set forth in claim 5 that contains from 0.05 percent to 4 percent by weight, based on the weight of the terpolymer, of recurring groups derived from glyoxal-bis-(trimethylolpropane acetal) and from 0.2 percent to 3 percent by weight, based on the weight of the terpolymer of recurring oxyethylene groups.

8. A normally solid terpolymer as set forth in claim 5 that contains from 0.05 percent to 4 percent by weight, based on the weight of the terpolymer, of recurring groups derived from the dimethyl ether of glyoxal-bis-(trimethylolpropane acetal) and from 0.2 percent to 3 percent by weight, based on the weight of the terpolymer, of recurring oxyethylene groups.

9. A normally solid terpolymer as set forth in claim 5 that consists essentially of recurring groups derived from (a) trioxane, (b) dimethyl ether of glyoxal-bis-(trimethylolpropane acetal), and (c) 1,3-dioxolane.

10. A process for the production of polymers which comprises contacting (a) a substantially anhydrous formaldehyde component selected from the group consisting of monomeric formaldehyde and trioxane with (b) from about 0.05 percent to about 20 percent by weight, based on the weight of the formaldehyde component, of a mixture of isomeric dicarbonals having structures represented by the formulas

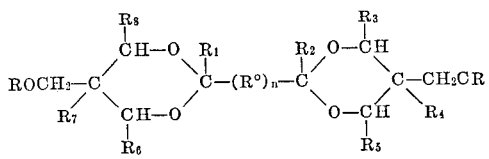

and

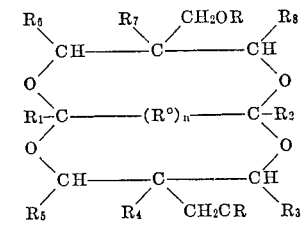

in each of which structures $R^0$ represents a divalent radical selected from the group consisting of alkylene, arylene, and aralkylene; $R$, $R_1$, $R_2$, $R_3$, $R_5$, $R_6$, and $R_8$ each represents a member selected from the group consisting of hydrogen and alkyl groups containing from 1 to 5 carbon atoms; $R_4$ and $R_7$ each represents an alkyl group containing from 1 to 5 carbon atoms; and $n$ represents an integer in the range of zero to 3, in a liquid reaction medium at a temperature in the range of about 0° C. to about 100° C. under substantially anhydrous conditions.

11. A process as set forth in claim 10 in which the polymerization is carried out at a temperature in the range of 20° C. to 70° C. in the presence of a formaldehyde polymerization initiator.

12. A process for the production of terpolymers which comprises contacting (a) a substantially anhydrous formaldehyde component selected from the group consisting of monomeric formaldehyde and trioxane with (b) from about 0.05 percent to about 20 percent by weight, based on the weight of the formaldehyde component, of a mixture of isomeric dicarbonals having structures represented by the formulas

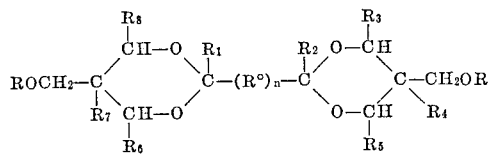

and

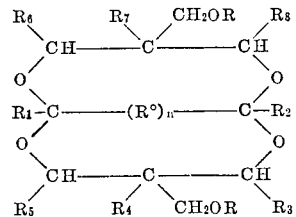

in each of which structures $R^0$ represents a divalent radical selected from the group consisting of alkylene, arylene, and aralkylene; $R$, $R_1$, $R_2$, $R_3$, $R_5$, $R_6$ and $R_8$ each represents a member selected from the group consisting of hydrogen and alkyl groups containing from 1 to 5 carbon atoms; $R_4$ and $R_7$ each represents an alkyl group containing from 1 to 5 carbon atoms; and $n$ represents an integer in the range of zero to 3 and (c) from about 0.5 percent to about 25 percent by weight, based on the weight of the formaldehyde component, of a cyclic ether having a structure represented by the formula

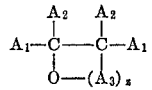

in which $A_1$ and $A_2$ each represent substituents selected from the group consisting of hydrogen, alkyl groups having from 1 to 3 carbon atoms, and halogen-substituted alkyl groups having from 1 to 3 carbon atoms, $A_3$ represents a divalent substituent selected from the group consisting of methylene, oxymethylene, lower alkyl- and haloalkyl-substituted methylene, and lower alkyl- and haloalkyl-substituted oxymethylene groups, and $z$ is an integer in the range of zero to three, in a liquid reaction medium and in the presence of a formaldehyde polymerization initiator at a temperature in the range of from about 0° C. to about 100° C. under substantially anhydrous conditions.

13. A process as set forth in claim 12 wherein trioxane is contacted with (a) from 0.1 percent to 10 percent by weight of the dimethyl ether of glyoxal-bis-(trimethylolpropane acetal) and (b) from 0.5 percent to 25 percent by weight of 1,3-dioxolane in the presence of a boron trifluoride polymerization initiator at a temperature in the range of 20° C. to 70° C.

References Cited

UNITED STATES PATENTS 3,219,630   11/1965   Sidi _____ 260—67
3,264,266   8/1966   Merten et al. _____ 260—73

WILLIAM H. SHORT, *Primary Examiner.*

L. M. PHYNES, *Assistant Examiner.*

U.S. Cl. X.R.

260—45.8, 45.9, 45.95